(12) United States Patent
Shu

(10) Patent No.: US 9,549,405 B2
(45) Date of Patent: Jan. 17, 2017

(54) WIRELESS TRANSMISSION METHOD, ACCESS POINT, AND STATION

(71) Applicant: Huawei Device Co., Ltd., Shenzhen, Guangdong (CN)

(72) Inventor: Guiming Shu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 84 days.

(21) Appl. No.: 14/334,382

(22) Filed: Jul. 17, 2014

(65) Prior Publication Data

US 2014/0349663 A1 Nov. 27, 2014

Related U.S. Application Data

(63) Continuation of application No. PCT/CN2013/070626, filed on Jan. 17, 2013.

(30) Foreign Application Priority Data

Jan. 17, 2012 (CN) .......................... 2012 1 0014068

(51) Int. Cl.
*H04W 72/00* (2009.01)
*H04W 72/04* (2009.01)
(Continued)

(52) U.S. Cl.
CPC ........ *H04W 72/0446* (2013.01); *H04L 5/0096* (2013.01); *H04W 52/0216* (2013.01);
(Continued)

(58) Field of Classification Search
CPC ...................... H04W 72/0446; H04W 52/0216; H04W 74/006; H04W 52/0222
(Continued)

(56) References Cited

U.S. PATENT DOCUMENTS 8,570,945 B2 * 10/2013 Seok .................. H04W 76/023
370/328
2005/0259676 A1 11/2005 Hwang
(Continued)

FOREIGN PATENT DOCUMENTS

CN 1450728 A 10/2003
CN 101313527 A 11/2008
(Continued)

OTHER PUBLICATIONS

"IEEE Standard for Information Technology—Telecommunications and information exchange between systems Local and metropolitan area networks—Specific requirements, Part 11: Wireless LAN Medium Access Control (MAC) and Physical Layer (PHY) Specifications," IEEE Std 802.11-2012, pp. i-2695, Institute of Electrical and Electronics Engineers, New York, New York (Mar. 29, 2012).

*Primary Examiner* — Marcos Batista
(74) *Attorney, Agent, or Firm* — Leydig, Voit & Mayer, Ltd.

(57) ABSTRACT

Embodiments of the present invention provide a wireless transmission method, an access point, and a station. The method includes: sending, by the access point, a first message to a first station, where the first message includes a channel service period allocated by the access point to the first station, and the first message is used to indicate that the first station sends data to a relay station of the first station in the channel service period; and receiving, by the access point, the data from the relay station of the first station.

42 Claims, 7 Drawing Sheets

(51) Int. Cl.
*H04W 52/02* (2009.01)
*H04W 74/00* (2009.01)
*H04L 5/00* (2006.01)
*H04W 84/04* (2009.01)

(52) U.S. Cl.
CPC ..... *H04W 52/0219* (2013.01); *H04W 74/006* (2013.01); *H04W 52/0222* (2013.01); *H04W 84/047* (2013.01)

(58) Field of Classification Search
USPC .......................................... 455/450; 370/338
See application file for complete search history.

(56) References Cited

U.S. PATENT DOCUMENTS

| | | | |
|---|---|---|---|
| 2007/0104138 A1 | 5/2007 | Rudolf et al. | |
| 2008/0108369 A1* | 5/2008 | Visotsky | H04B 7/2606 455/455 |
| 2009/0088070 A1* | 4/2009 | Aaron | H04W 72/085 455/7 |
| 2010/0130193 A1* | 5/2010 | Li | H04W 28/08 455/424 |
| 2010/0136983 A1* | 6/2010 | Lu | H04W 40/22 455/446 |
| 2010/0157826 A1* | 6/2010 | Yu | H04B 7/155 370/252 |

FOREIGN PATENT DOCUMENTS

| | | |
|---|---|---|
| CN | 101583151 A | 11/2009 |
| CN | 102223734 A | 10/2011 |
| WO | WO 2009113834 A2 | 9/2009 |

* cited by examiner

WIRELESS TRANSMISSION METHOD, ACCESS POINT, AND STATION

CROSS-REFERENCE TO RELATED APPLICATIONS

This application is a continuation of International Patent Application No. PCT/CN2013/070626, filed on Jan. 17, 2013, which claims priority to Chinese Patent Application No. 201210014068.6, filed on Jan. 17, 2012, both of which are hereby incorporated by reference in their entireties.

TECHNICAL FIELD

Embodiments of the present invention relate to the field of wireless communications, and more specifically, to a wireless transmission method, an access point, and a station.

BACKGROUND

At present, the Institute of Electrical and Electronics Engineers (IEEE) standard organization of the United States of America is formulating the 802.11ah standard and puts forward a requirement that a coverage area of an access point should cover one kilometer. This means that a distance of 100 meters covered by the access point supported by the existing 802.11 standard is increased by 100 times. In addition, a primary application scenario proposed for the 802.11ah standard is a sensor network, for example, a wireless sensor network for detecting a forest fire. The access point supported by the 802.11ah standard has a coverage radius of 1 kilometer, which is far greater than the 100-meter coverage-radius defined in such standards as 802.11a/b/g/n. However, to implement effective detection in an area with a radius of 1 kilometer, the number of 802.11ah-compliant sensors required to be deployed may exceed 6,000. However, because a station (Station, STA) used for sensor detection is usually powered by a battery, and due to the number of the stations to be deployed and a deployment scenario (for example, a mountain forest), it is inconvenient for a user to replace and maintain a battery of an STA.

According to the current Wi-Fi standards, for example, the series of 802.11 standards, on both an uplink and a downlink, an STA working in basic network mode directly communicates with an access point (Access Point, AP) at a power negotiated with the AP. The negotiated communication power is directly related to a distance between the STA and the AP. Therefore, during communication with the AP, STAs that are deployed in a coverage area of the AP and have different distances from the AP have different power consumption rates. In general, on a precondition of a transmission task with a same amount of data, an STA farther from the AP consumes more power. In addition, more power may be consumed due to deployment of an STA (for example, a barrier exists between the STA and the AP). Therefore, a few STAs with low capacity may be unable to continuously perform normal data transmission with the AP due to excessively quick power consumption.

SUMMARY

Embodiments of the present invention provide a wireless transmission method, an access point, and a station, which enable the station to perform normal data transmission with the access point by using another station.

According to one aspect, a wireless transmission method is provided and includes: sending, by an access point, a first message to a first station, where the first message includes a channel service period allocated by the access point to the first station, and the first message is used to indicate that the first station sends data to a relay station of the first station in the channel service period; and receiving, by the access point, the data from the relay station of the first station.

According to one aspect, a wireless transmission method is provided and includes: receiving, by a first station, a first message from an access point, where the first message includes a channel service period allocated by the access point to the first station; and sending, by the first station, data to a relay station of the first station in the channel service period, so that the relay station of the first station sends the data to the access point.

According to one aspect, a wireless transmission method is provided and includes: receiving, by a second station, a message that is used to indicate that the second station serves as a relay station; receiving, by the second station, data from a first station within a channel service period allocated by an access point to the first station; and transmitting, by the second station, the data received from the first station to the access point.

According to one aspect, an access point is provided and includes: a sending module, configured to send a first message to a first station, where the first message includes a channel service period allocated by the access point to the first station, and the first message is used to indicate that the first station sends data to a relay station of the first station in the channel service period; and a receiving module, configured to receive the data from the relay station of the first station.

According to another aspect, a station is provided and includes: a receiving module, configured to receive a first message from an access point, where the first message includes a channel service period allocated by the access point to the station; and a sending module, configured to send data to a relay station of the station in the channel service period, so that the relay station of the station sends the data to the access point.

According to another aspect, a station is provided and includes: a receiving module, configured to receive a message that is used to indicate that the station serves as a relay station, and receive data from a first station in a channel service period allocated by an access point to the first station; and a sending module, configured to transmit the data received from the first station to the access point.

According to another aspect, a communications system is provided and includes the access point and the station, where the station is a sensor on a wireless sensor network, and the access point is an access point on the wireless sensor network.

In the embodiments of the present invention, an access point sends an allocated channel service period to a first station, so that the first station sends data to another station in the channel service period; and then the another station sends the data to the access point, so that the first station performs normal data transmission with the access point by using the another station.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
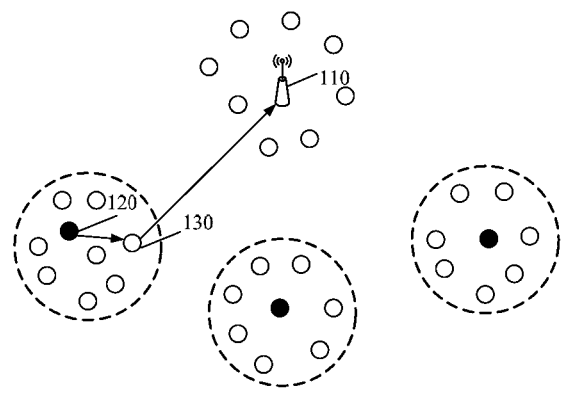
FIG. 1 is a schematic architecture diagram of a communications system according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Technical solutions of the present invention may be applicable to various types of wireless communications systems, such as systems based on wireless fidelity (Wireless Fidelity, WI-FI), Bluetooth (Bluetooth), worldwide interoperability for microwave access (Worldwide Interoperability for Microwave Access, WiMAX), and wireless LAN authentication and privacy infrastructure (Wireless LAN Authentication and Privacy Infrastructure, WAPI), and other communications systems that interconnect terminals in a wireless manner. For ease of description, a Wi-Fi system is used as an example in the following embodiments, but the present invention is not limited thereto.

An access point (Access Point, AP) may also be called a wireless access point, a bridge, a hotspot, or the like, and may access a server or a communications network.

A station (Station, STA) may be a wireless sensor, a wireless communications terminal, or a mobile terminal, such as a mobile phone (also referred to as a "cellular" phone) supporting a Wi-Fi communication function and a computer with a wireless communication function, for example, a portable, pocket-sized, handheld, computer-embedded, or vehicle-mounted wireless communications apparatus that supports the Wi-Fi communication function and exchanges languages and/or data with a radio access network. For ease of description, the wireless sensor is used as an example in the following embodiments, but the present invention is not limited thereto.

On a sensor network deployed by using a Wi-Fi wireless technology, all STAs (for example, sensors) in a coverage area of an AP directly communicate with the AP at a power negotiated with the AP. Under an equal data communication condition, the STA closer to the AP consumes less power because the STA may communicate with the AP at a lower power; while the STA farther from the AP may consume power more quickly because the STA communicates with the AP at a higher power, which results in an imbalance in power consumption of sensor STAs on the entire sensor network, and causes inconvenience to unified maintenance of the sensor network if a great number of STAs are covered by the AP.

When remaining capacity of an STA decreases to a capacity value due to the foregoing reasons, the STA may be unable to directly and continuously communicate with the AP for a long time because the STA is far away from the AP, but the STA may still continuously communicate, at a lower power, with an STA in an adjacent area for a long time; or after an STA sends out low capacity alarm information and before a maintenance engineer replaces a battery in time, it is expected that normal working hours of the sensor STA can be prolonged to a greatest extent until the maintenance engineer replaces the battery, so as to avoid missing detection data when an accident occurs.

According to the embodiments of the present invention, before an STA can directly and continuously send data to an AP, the STA may be enabled to send the data to the AP by using another STA. For example, when remaining capacity of a first STA is lower than a threshold, the first STA that is farther from the AP may be unable to directly and continuously communicate with the AP, but the first STA may still continuously communicate, at a lower power, with a neighboring STA that is closer to the first STA for a period of time. Therefore, the first STA reports the data that is supposed to be directly sent to the AP to the neighboring STA, and then the neighboring STA sends the data to the AP. In addition, because an AP device is usually powered by mains supply, a circumstance of power exhaustion may not be taken into consideration. Each sensor STA may directly receive the data sent by the AP on a downlink, and normal uplink and downlink data transmission of the STA can be ensured because the STA usually consumes less power when it receives data than when it sends data.

In addition, on a Wi-Fi sensor network based on the 802.11ah standard, to maintain normal operation of the entire sensor network to a greatest extent, it may be necessary to enable each STA to consume power evenly, so as to avoid a problem that some STAs on the sensor network use up the power too early. When a sensor STA that is on a network and is deployed on an edge of a coverage area of a Wi-Fi AP on the sensor network cannot directly send data to the AP at a higher power due to low remaining capacity, the sensor STA requests an adjacent STA to relay the data for the sensor STA, so as to reduce power consumption and extend working hours, thereby ensuring a normal sensor detection function.

FIG. 1 is a schematic architecture diagram of a communications system 100 according to an embodiment of the present invention. The communications system shown in FIG. 1 includes an AP 110, an STA 120, and an STA 130.

The AP 110 may provide an access service for a plurality of STAs 120, and each STA 120 may directly communicate with an AP at a proper negotiated and distance-related power. The AP 110 may provide a channel service period (Service Period, SP) for each STA 120 to enable each STA 120 to communicate with the AP 110 in the channel service period. To reduce power consumption, the STA 120 is usually in a sleep state when there is no data to transmit. The STA 120 enters an awake state only when it is required to send or receive data. In addition, the STA 120 sends data in the channel service period allocated by the AP, or after waking up, receives the data from the AP or another STA. For example, the STA reports, to the AP, detected data such as a temperature signal or a pressure signal, and then the AP reports the data to a server. Each STA 120 may receive a data frame or a message from the STA or the AP in an "awake period (Awake Period)", or send a data frame or a message in the channel service period.

Each STA 120 may have a plurality of adjacent STAs, which are called neighboring STAs 130 herein. According to this embodiment of the present invention, an STA whose transmit power is less than a threshold when communicating with the STA 120 may be determined as a neighboring STA, and this embodiment according to the present invention is not limited thereto; for example, an STA whose distance from the STA 120 is less than a threshold may be determined as the neighboring STA. Each STA 120 may communicate with the neighboring STA 130 at a proper negotiated power. For example, during negotiation of the power, the STA 120 may send a message that carries information about the transmit power to the STA 130. The STA 130 may measure an actual signal strength at a time when the message is received, compare the signal strength with the carried transmit power to determine a power loss during transmission of a wireless signal, and send a response message to the STA 120 at a transmit power greater than the power loss; and the STA 120 may learn the proper transmit power according to the response message.

For example, if the AP 110 allocates the same awake period to an STA 120 and the neighboring STA 130, the STA 120 may send a control frame or a data frame to the awake neighboring STA 130 in the channel service period, and the neighboring STA may send the data frame to the AP 110 at a proper time.

According to this embodiment of the present invention, the neighboring STA 130 (also referred to as a relay STA 130 in this specification) may determine whether to relay data (that is, send data to the AP) according to a source address in the received data if the neighboring STA 130 knows identification information of the STA 120; for example, if the source address is consistent with the identification information of the STA 120, the data is relayed. The relay STA 130 may determine whether to relay the data according to a destination address in the received data if the identification information of the STA 120 is unknown; for example, if the destination address is consistent with identification information of the relay STA 130, the data is relayed.

Particularly, the STA 120 may be an STA (or a sensor) on a Wi-Fi wireless sensor network, and the AP 110 may be an AP on the Wi-Fi wireless sensor network.

Figure 2:
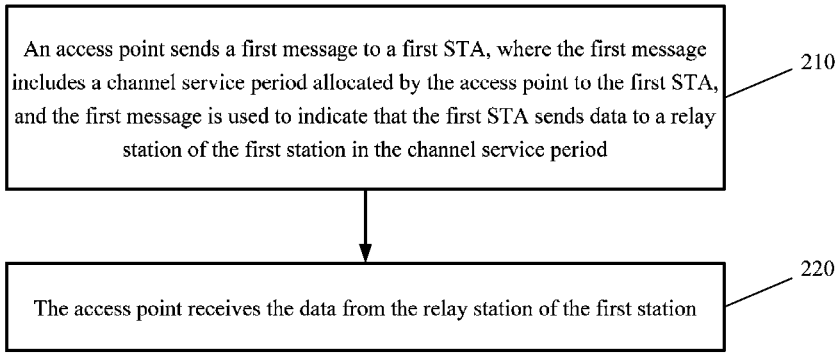
FIG. 2 is a schematic flowchart of a wireless transmission method according to an embodiment of the present invention.

FIG. 2 is a schematic flowchart of a wireless transmission method according to an embodiment of the present invention. The method shown in FIG. 2 is performed by the AP shown in FIG. 1.

210. The AP sends a first message to a first STA, where the first message includes a channel service period allocated by the AP to the first STA, and the first message is used to indicate that the first STA sends data to a relay STA of the first STA in the channel service period.

The first STA refers to any STA that is in a coverage area of the AP and needs to send data to the AP by using another STA. For example, the first STA may inform the AP, by using a relay request message, that the first STA needs to send the data to the AP by using the relay STA, and the AP may further determine which STA needs to send the data to the AP by using the relay STA. In addition, the first STA may further inform the AP, by using the relay request message, that which STA is used to send the data; the AP may also determine which STA serves as the relay STA of the first STA.

For example, after the AP determines that the first STA can send the data to the AP by using the relay STA, the AP may allocate, to the first STA, the channel service period, in which the first STA reports the data to the AP by using the relay STA. A channel corresponding to the channel service period described herein may be a channel currently used by the AP or another channel. In addition, the allocated channel service period is sent to the first STA by using the first message (for example, a relay response message). It should be noted that when the channel corresponding to the channel service period is not the channel currently used by the AP, channel identification information corresponding to the channel service period needs to be carried at the time when the AP sends the allocated channel service period to the first STA. For example, the channel identification information may be such a parameter as a channel index number or a channel central frequency.

For example, the channel service period may be the same as an awake period allocated by the AP to the relay STA. This embodiment according to the present invention is not limited thereto. For example, the channel service period may also be a dedicated channel service period for the first STA to send data by using the relay STA. In this case, the relay STA needs to be informed of the channel service period, so that the relay STA knows that it should wake up in the channel service period to receive the data sent by the STA. For example, the AP may inform a neighboring STA of the first STA that the neighboring STA serves as the relay STA of the first STA. This embodiment according to the present invention is not limited thereto, for example, the first STA may inform the neighboring STA that the neighboring STA serves as the relay STA.

220. The AP receives the data from the relay STA of the first STA.

For example, when the first STA sends the data on the channel in the channel service period, a second STA may receive the data. The second STA may immediately and directly forward a received data frame to the AP, or send the data (that is, relay data) received from the first STA to the AP at a proper time. The second STA may report the relay data only to the AP, or report data formed by integrating the relay data with data of the second STA and/or data of other STAs to the AP. According to this embodiment of the present invention, identification information of an STA may be used to distinguish data of different STAs.

For example, the data may adopt a form of a data frame; the data frame may include identification information of the first STA (for example, a MAC address) as a source address, and include an address of the second STA as a destination address.

For example, upon completion of deployment of a wireless sensor network, a user may configure information about neighboring STAs for each STA; or when each STA in a surrounding area directly communicate with the AP to perform a network access operation, the STA may further obtain the information about the neighboring STAs in the surrounding area by receiving messages for the STAs in the surrounding area to communicate with the AP, and store and maintain the information about the neighboring STAs of the STA in the STA or the AP. For example, when the user statically configures information about neighboring STAs for an STA in advance in the AP according to physical deployment location information of the STA on the network, the AP may filter the neighboring STAs included in the information about the neighboring STAs, which is statically configured in advance, according to an actual network access condition of the STAs after the network operates, and form information about available neighboring STAs, which includes only neighboring STAs that have already accessed the network; or when a neighboring STA exits the network, the AP deletes information about the STA that exits the network from a list of the available neighboring STAs.

For example, when the first STA (for example, an STA on an edge of the coverage area of the AP) completes initial access to the network, or when remaining capacity of the first STA is lower than a set threshold (when the remaining capacity is lower than the threshold, the STA cannot continuously report monitoring data to the AP at a higher sending power), the first STA sends the relay request message to the AP. After receiving the relay request message, the AP selects, for the first STA and according to the stored information about the neighboring STAs of the first STA, one neighboring STA as the relay STA (or referred to as a relay node) for reporting data, and feeds back the information about the neighboring STA selected for relay to the first STA by using a relay response message, and informs, by using a relay indication message, the neighboring STA selected for relay of information about the first STA that requests transmission of the data in relay mode. Then the first STA reports the data to the neighboring STA selected for relay. The relay STA may send the data alone or together with data of the relay STA and/or data of other STAs to the AP, thereby ensuring normal data transmission between the STA and the AP by transmitting the data in relay mode.

In this embodiment of the present invention, an AP may send an allocated channel service period to an STA, so that the STA sends data to another STA in the channel service period, and then the another STA sends the data to the AP, so that the STA performs normal data transmission with the AP by using the another STA.

Optionally, in another embodiment, the method shown in FIG. 2 further includes: sending, by the AP, a second message to the second STA, where the second message is used to indicate that the second STA serves as the relay STA.

For example, the second message may be the relay indication message, which is used to enable a relay function of the second STA. The AP may indicate, by using the relay indication message, that the second STA serves as the relay STA to relay the data of the first STA. The first STA or the second STA (that is, the relay STA) that receives the channel service period enters an awake state in the channel service period; at this time, as the relay STA, the second STA receives the data frame or a control frame from the first STA. After the relay function is enabled, the second STA reports the data (for example, the data whose destination address is an address of the second STA) received from the another STA to the AP.

Optionally, in another embodiment, the AP may also indicate, by using the relay response message or the relay indication message actively sent by the AP, that the first STA transmits data in relay mode by using the second STA in the channel service period. Optionally, the first STA may negotiate a power with the second STA and sends data at the negotiated power.

Optionally, in another embodiment, the second message further includes the identification information of the first STA, and is used to indicate that the second STA serves as the relay STA of the first STA.

For example, if the channel service period allocated by the AP to the first STA is the same as an awake period agreed on between the second STA and the AP in advance, the AP only needs to notify the second STA that the second STA serves as the relay STA of the first STA. The second STA receives the data from the first STA in the awake period of the second STA, and reports the data to the AP, so as to reduce a signaling overhead.

Optionally, in another embodiment, the second message further includes the identification information of the first STA and the channel service period in which the first STA sends data to the relay STA, and is used to indicate that the second STA serves as the relay STA of the first STA, and indicate that in the channel service period, the second STA receives, from the first STA, the data on the channel currently used by the AP.

In this case, the second STA receives the data in the channel service period specially allocated to the first STA.

Optionally, in another embodiment, the second message includes the identification information of the first STA and the channel identification information corresponding to the channel service period, and is used to indicate that the second STA serves as the relay STA of the first STA, and indicate that in the channel service period, the second STA switches to a channel corresponding to the channel identification information to receive the data from the first STA.

For example, if the channel corresponding to the channel identification information is different from the channel currently used by the AP, the second STA may switch to the channel corresponding to the channel identification information to transmit relay data according to the channel identification information included in the second message.

Optionally, in another embodiment, the first message further includes identification information of the second STA, and the identification information of the second STA is used by the first STA to determine that the second STA serves as the relay STA of the first STA.

Optionally, in another embodiment, the first message includes identification information of the second STA and the channel identification information corresponding to the channel service period, where the identification information of the second STA is used by the first STA to determine that the second STA serves as the relay STA of the first STA, and the channel identification information corresponding to the channel service period is used to indicate that in the channel service period, the first STA switches to the channel corresponding to the channel identification information to send the data to the second STA, where in the channel service period, the first STA switches to the channel corresponding to the channel identification information to send the data to the second STA.

Optionally, in another embodiment, the AP further selects the second STA as the relay STA of the first STA from the information about the neighboring STAs of the first STA, where the information about the neighboring STAs of the first STA is used to indicate information about STAs adjacent to the first STA.

Optionally, in another embodiment, the AP further stores and maintains the information about the neighboring STAs of the first STA, and sends a message that includes the information about the neighboring STAs of the first STA to the first STA.

For example, the information about the neighboring STAs of the first STA in the coverage area of the AP is stored and maintained in the AP, and is sent to the first STA by using an association response message.

Optionally, in another embodiment, the AP further receives, from the first STA, a message that carries the information about the neighboring STAs of the first STA, and maintains the information about the neighboring STAs of the first STA.

For example, the information about the neighbors of the first STA may be stored and maintained in the first STA and be reported to the AP by using the association request message during initial network access.

Optionally, in another embodiment, the AP further receives from the first STA a message that carries location information of the first STA, and determines and maintains the information about the neighboring STAs of the first STA according to the location information of the first STA.

For example, the first STA obtains its own location information by using its own locating function, and reports the location information to the AP by using a dedicated message or the existing association request message. The AP determines the information about the neighboring STAs of the first STA according to the location information. In addition, if the AP is a smart antenna, the AP may further obtain information about neighboring STAs of each STA by means of a beam forming technology and information about the power selected after the negotiation for communicating with the STA.

Optionally, in another embodiment, before the AP sends the first message to the first STA, the AP further receives the relay request message from the first STA, and the relay request message is used by the first STA to request sending of data to the AP by using the relay STA of the first STA.

According to this embodiment of the present invention, after receiving the relay request message, the AP may select, from the information about the neighboring STAs of the first STA and according to a preset policy, the second STA as the relay STA.

For example, the preset policy may be a policy to determine whether the second STA specified by the first STA supports a data relay function according to remaining capacity of the first STA and that of the second STA. This embodiment according to the present invention is not limited thereto; for example, the preset policy may include: whether the second STA has served as a relay STA of another STA; whether the second STA is closest to the first STA; whether the second STA is closest to the AP; whether a sum of a distance between the first STA and the second STA and a distance between the second STA and the AP is the smallest; and whether power consumed by the first STA is the least when it communicates with the AP by using the second STA, in comparison with power consumed by the first STA when it communicates with the AP by using another STA.

For example, if the relay response message sent to the first STA carries the identification information of the second STA, the relay indication message sent to the second STA may not carry the identification information of the first STA. If the relay indication message carries the identification information the first STA, the relay response message may not carry the identification information of the second STA.

Optionally, in another embodiment, the relay request message further includes: identification information of the STA selected by the first STA from the information about the neighboring STAs of the first STA and used to transmit data in relay mode; the information about the neighboring STAs of the first STA is used to indicate information about the STA adjacent to the first STA.

For example, the AP may select, from the information about the neighbor STAs of the first STA and according to the preset policy, the second STA as the relay STA or the neighboring STA as the relay STA.

For example, the AP may determine whether the neighboring STA specified in the relay request message is the relay STA according to the preset policy. If the neighboring STA does not meet a condition of serving as the relay STA, another STA that meets the condition may be selected as the relay STA from the information about the neighboring STAs stored in the AP. The AP may add identification information of the STA selected as the relay STA to the relay response message. Certainly, when it is determined that the neighboring STA specified in the relay request message is the relay STA, the relay response message may not carry identification information of the relay STA, which implies that the neighboring STA specified in the relay request message is the relay STA.

According to this embodiment of the present invention, in step 210, the AP actively sends the first message to the first STA according to the preset policy.

For example, the preset policy may be a policy used to balance power consumed by the STAs in the coverage area of the AP. The AP may determine whether an STA needs to transmit data by using the relay STA according to obtained information about remaining battery capacity of the STA. For example, when a percentage of the remaining battery capacity of the STA in the total battery capacity is lower than a preset threshold, it is determined that the STA needs to perform data transmission in relay mode; or when the remaining battery capacity of the STA is lower than a battery level of another adjacent STA, it is determined that the STA needs to perform data transmission in relay mode. This embodiment according to the present invention is not limited thereto. For example, when finding that a barrier exists between the STA and the AP, the AP may also actively send the first message to the first STA, so as to communicate with the first STA by using the relay STA.

For example, the preset policy may be that: when a difference between remaining capacity of an STA and capacity of a neighboring STA exceeds a preset threshold, the STA with more capacity may transmit the data for the STA with less capacity in relay mode. For example, the neighboring STA that has a greatest capacity difference with or is the closest to the STA, or the STA that is the closest to the AP may be preferably selected as the relay STA.

According to this embodiment of the present invention, an STA with less remaining capacity reports, at a lower power, data to an AP by using a neighboring STA, which can narrow a difference in remaining capacities of different STAs, and enable power of batteries of the STAs covered by the AP to be evenly consumed, thereby ensuring balanced consumption of the power of the batteries of the STAs. Therefore, a person may uniformly replace the batteries, thereby reducing a workload.

In addition, a first STA and a second STA may communicate with each other at a negotiated proper power, so as to further reduce battery consumption.

Figure 3:
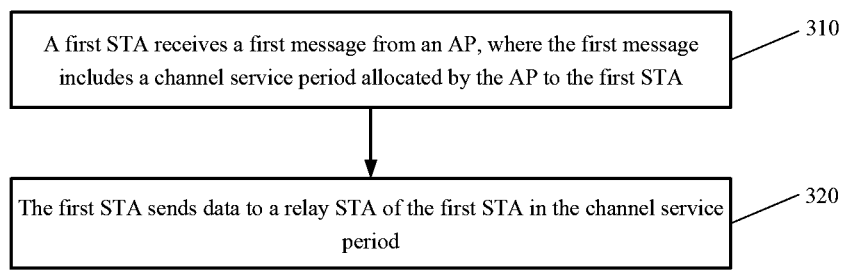
FIG. 3 is a schematic flowchart of a wireless transmission method according to another embodiment of the present invention.

FIG. 3 is a schematic flowchart of a wireless transmission method according to another embodiment of the present invention. The method shown in FIG. 3 is performed by an STA shown in FIG. 1. The method shown in FIG. 3 is corresponding to the method shown in FIG. 2. Some details are omitted herein as appropriate.

310. A first STA receives a first message from an AP, where the first message includes a channel service period allocated by the AP to the first STA.

For example, the first STA may determine a relay STA by itself, and may also determine the relay STA according to an indication of the AP. The first message is used to indicate that the first STA sends data to the relay STA in the channel service period, and may include identification information of the relay STA determined by the AP.

320. The first STA sends the data to the relay STA of the first STA in the channel service period, so that the relay STA of the first STA sends the data to the AP.

In this embodiment of the present invention, an AP may send an allocated channel service period to an STA, so that the STA sends data to another STA in the channel service period, and then the another STA sends the data to the AP, so that the STA performs normal data transmission with the AP by using the another STA.

According to this embodiment of the present invention, in step 310, the first STA may select, from information about neighboring STAs, a second STA as the relay STA.

Optionally, in another embodiment, the first message includes identification information of the second STA, where the identification information of the second STA is used by the first STA to determine that the second STA serves as the relay STA of the first STA.

Optionally, in another embodiment, the first message includes channel identification information corresponding to the channel service period; and the first STA sends data to the relay STA of the first STA in the channel service period. Specifically, in the channel service period, the first STA switches to a channel corresponding to the channel identification information to send the data to the relay STA of the first STA.

Optionally, in another embodiment, the method further includes: selecting, by the first STA and from the information about the neighboring STAs stored in the first STA, the second STA as the relay STA.

Optionally, in another embodiment, the method shown in FIG. 3 further includes: sending, by the first STA, a message that carries location information of the first STA to the AP.

Optionally, in another embodiment, the method shown in FIG. 3 further includes: receiving, by the first STA and from the AP, a message that carries the information about the neighboring STAs of the first STA, which is maintained by the AP.

Optionally, in another embodiment, the method shown in FIG. 3 further includes: sending, by the first STA and to the AP, the message that carries the information about the neighboring STAs of the first STA, which is stored in the first STA.

Optionally, in another embodiment, the method shown in FIG. 3 further includes: before the first STA receives the first message from the AP, sending, by the first STA, a relay request message to the AP, where the relay request message is used to request sending of data to the AP by using the relay STA of the first STA.

In step 310, the first message may be a response message to the relay request message, that is, a relay response message.

According to this embodiment of the present invention, the relay request message further carries identification information of an STA (a relay STA) selected by the first STA from the information about the neighboring STAs and used for data transmission in relay mode.

According to this embodiment of the present invention, the first STA sends the relay request message to the AP when a battery level is lower than a first preset threshold.

For example, the distance may be determined according to a distance between the first STA and the AP. If the battery level is not lower than the first preset threshold, continuous communication between the first STA and the AP may be ensured.

Optionally, in another embodiment, the first STA sends the relay request message to the AP when completing initial access to a network.

For example, when the first STA is an STA located on an edge of a coverage area of the AP, to avoid consuming too much power when the first STA directly communicates with the AP, the first STA may send data to the AP by using the relay STA at the beginning of the access to the network, so as to reduce battery consumption.

In step 310, the first STA receives, from the AP, the first message actively sent by the AP, and the first message is used to indicate that the first STA sends the data to the relay STA.

Optionally, in another embodiment, the first STA further sends a third message to the second STA, where the third message carries the identification information of the second STA, and is used to indicate that the second STA serves as the relay STA of the first STA.

For example, the third message is a relay indication message, and is used to indicate that the second STA serves as the relay STA of the first STA.

For example, the first STA may inform, by using a dedicated relay indication message, the second STA that the second STA serves as the relay STA.

Optionally, the first STA sends the third message to the second STA, where the third message includes the identification information of the second STA, and is used to indicate that the second STA serves as the relay STA of the first STA, and indicate that in the channel service period, the second STA switches to the channel corresponding to the channel identification information to receive the data from the first STA.

Optionally, in another embodiment, the first STA further sends, to the second STA, a message that includes control information and the data, and the control information is used to indicate that the second STA transmits the data in relay mode for the first STA.

For example, the first STA may indicate, by using a dedicated relay indication message, that the second STA serves as the relay STA of the first STA, or indicate, by using a flag bit in a data frame to be sent to the second STA, that the data frame is transmitted in relay mode by using the second STA; the data frame sent by the first STA may further carry the identification information (for example, a MAC address) of the second STA, as a destination address.

Figure 4:
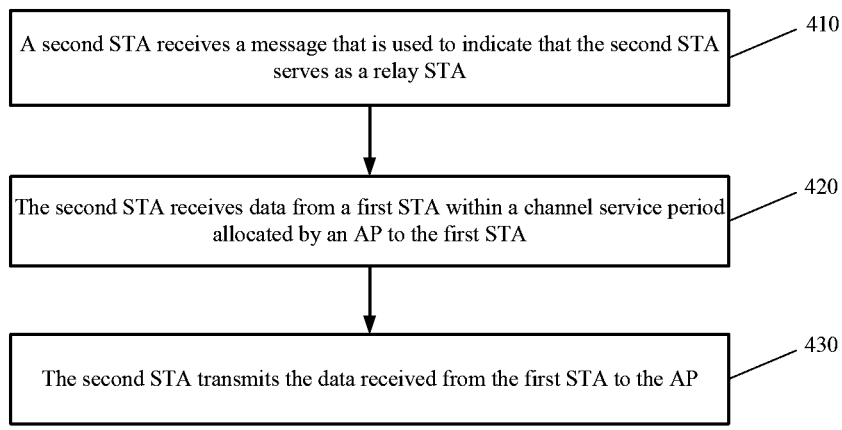
FIG. 4 is a schematic flowchart of a wireless transmission method according to another embodiment of the present invention.

FIG. 4 is a schematic flowchart of a wireless transmission method according to another embodiment of the present invention. The method shown in FIG. 4 is performed by the STA 130 shown in FIG. 1. The method shown in FIG. 4 is corresponding to the methods shown in FIG. 2 and FIG. 3. Some details are omitted herein as appropriate.

410. A second STA receives a message that is used to indicate that the second STA serves as a relay STA.

For example, the second STA may receive a relay indication message from an AP or a first STA, so as to determine that the second STA serves as the relay STA.

420. The second STA receives data from the first STA in a channel service period allocated by the AP to the first STA.

For example, the channel service period is a period allocated by the AP to the first STA and used to send data to the relay STA. The channel service period may be the same as an awake period of the second STA. In this case, it is not required to notify the second STA of the channel service period, thereby saving a signaling overhead. Optionally, the channel service period may further be a channel service period allocated by the AP to the first STA and specially used to send data to the second STA.

430. The second STA transmits the data received from the first STA to the AP.

Optionally, in another embodiment, the second STA may receive a second message from the AP, where the second message includes identification information of the first STA, and is used to indicate that the second STA serves as a relay STA of the first STA.

In this embodiment of the present invention, an AP may send an allocated channel service period to an STA, so that the STA sends data to another STA in the channel service period, and then the another STA sends the data to the AP, so that the STA performs normal data transmission with the AP by using the another STA.

Optionally, in another embodiment, the second STA may receive a second message from the AP, where the second message includes the identification information of the first STA and the channel service period in which the first STA sends data to the relay STA, and is used to indicate that the second STA receives the data from the first STA in the channel service period.

Optionally, in another embodiment, the second STA receives, from the first STA, a message that includes control information and the data, where the control information is used to indicate that the second STA transmits the data in relay mode for the first STA.

Optionally, the second STA receives a third message from the first STA, where the third message is used to indicate that the second STA serves as the relay STA of the first STA.

Optionally, in another embodiment, the second STA may receive a third message from the first STA, where the third message is used to indicate that the second STA serves as the relay STA of the first STA; in addition, the third message includes channel identification information corresponding to the channel service period, and is used to indicate that in the channel service period, the second STA switches to a channel corresponding to the channel identification information to transmit the data.

Optionally, in another embodiment, the second STA receives a second message from the AP, where the second message includes the channel identification information corresponding to the channel service period, and is used to indicate that in the channel service period, the second STA switches to the channel corresponding to the channel identification information to transmit the data.

In step 430, the second STA directly sends the data received from the first STA to the AP.

For example, the AP may directly forward the data without parsing data in a data message, so as to report the data of the second STA in time.

Optionally, in step 430, the second STA sends data formed by integrating the data received from the first STA with the data of the second STA and/or data of a third STA to the AP, where the second STA is a relay STA of the third STA.

For example, the AP may obtain the data by parsing, integrate multiple sets of data, and then send the data. For example, when the second STA also serves as a relay STA of another STA, the second STA may pack the data of the second STA with data of other STAs and then send the packed data to the AP, so as to reduce power consumption.

The following describes the embodiments of the present invention in more detail with reference to specific examples.

Figure 5:
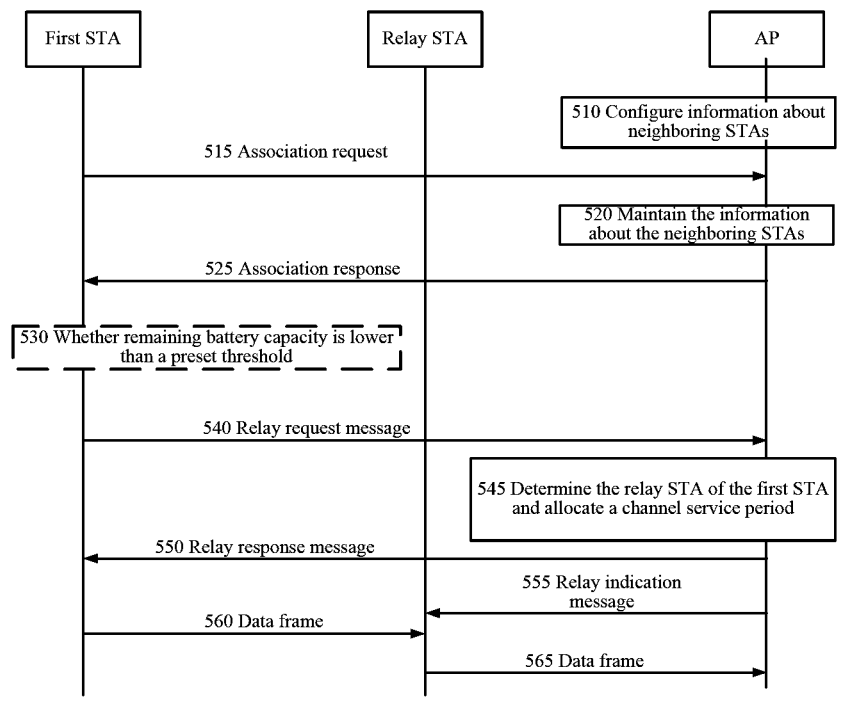
FIG. 5 is a schematic flowchart of a wireless transmission process according to an embodiment of the present invention.

FIG. 5 is a schematic flowchart of a wireless transmission process according to an embodiment of the present invention.

This embodiment describes an application scenario when information about neighbors of an STA is only maintained in an AP.

510. Pre-store, in the AP, information about neighboring STAs of a first STA in a coverage area of the AP.

The first STA may refer to any STA in the coverage area of the AP. When a sensor network is deployed, information about neighboring STAs surrounding each deployed STA is configured in the AP according to a deployment location of each STA. For example, a neighboring STA list is stored for each STA in the coverage area of the AP, where the neighboring STA list may be formed by identification information of the STA, such as a media access control (Media Access Control, MAC) address, STA identification (ID), an association identifier (Association Identifier, AID), or an IP address of a neighboring STA.

515. The first STA sends an association request (Association Request) message to the AP during initial network access, so as to establish an association with the AP.

520. The AP maintains the information about the neighboring STAs for each STA.

The AP maintains the pre-stored information about the neighboring STAs of the first STA according to a network access condition of the STA. For example, when a user statically configures information about neighboring STAs for an STA in advance in the AP according to physical deployment location information of the STA on a Wi-Fi sensor network, the AP may filter the neighboring STAs included in the information about the neighboring STAs, which is statically configured in advance, according to the actual network access condition of the STA after the network operates, and form information about available neighboring STAs, which includes only neighboring STAs that have already accessed the network; or when a neighboring STA exits the network, the AP deletes information about the STA that exits the network from a list of the available neighboring STAs.

525. The AP sends an association response (Association Response) message to the first STA, so as to establish the association with the STA.

Optionally, when each STA accesses the network, the AP may deliver, by using the association response message, the information about the neighboring STAs maintained for each STA to the first STA.

530. The first STA determines whether remaining battery capacity of the first STA is lower than a preset threshold.

For example, when a battery level of the first STA is lower than the preset threshold, the first STA cannot continuously send data to the AP. Step 530 is optional. For example, the first STA may determine whether another preset policy meets a requirement.

540. The first STA sends a relay request message to the AP when the battery level of the first STA is lower than the preset threshold, so as to request transmission of data by using a relay STA. Step 540 is optional.

For example, when a battery level of a first sensor STA is lower than a preset threshold (the first STA cannot continuously report monitoring data to the AP at a higher sending power at this time), sending of a relay request message to the AP is triggered.

Optionally, the first STA may further send the relay request message to the AP when the another preset policy is valid. For example, the relay request message may be sent to the AP as required when the remaining capacity of the first STA is sufficient for continuous data transmission with the AP. For example, the remaining capacity of the first STA is sufficient, but the first STA is rather far from the AP. To synchronize power consumption with other STAs closer to the AP, data may be relayed to the AP by using a relay STA closer to the AP. For an STA on an edge of the coverage area of the AP, the STA may send the relay request message to the AP when the first STA completes the initial access to the network, so as to report data to the AP by using a neighboring STA closer to the AP, thereby balancing battery consumption.

545. After receiving the relay request message, the AP determines, from the information about the neighboring STAs maintained by the AP and according to a preset policy, the relay STA used for data transmission in relay mode, and allocates a channel service period used for data transmission in relay mode to the first STA and the relay STA. Further, a channel corresponding to the channel service period described herein may be a channel currently used by the AP or may be another channel.

For example, the AP may also determine, according to capacity information of each STA, whether to perform data transmission by using the relay STA. The AP selects, according to information about a list of the neighboring STAs of the first STA maintained by the AP, a neighboring STA to serve as the relay STA for data reporting based on the preset policy. The preset policy may include whether remaining capacity of the neighboring STA allows data transmission in relay mode, a distance between the first STA and the neighboring STA, whether the neighboring STA has already served as a relay STA of another STA, or the like.

The AP may sample battery level information of each STA; for example, the STA periodically reports information, or the AP performs polling on each STA. Optionally, the AP may measure the battery level according to a transmit power of each STA for sending a message. For example, the message may carry the transmit power of an STA for sending the message. A higher transmit power indicates greater consumed capacity and less remaining capacity. For another example, the AP may estimate the remaining battery capacity of the STA after a period of time according to an initial battery level of the STA and an empirical value.

Optionally, if the relay request message carries identification information of the neighboring STA selected by the first STA, the AP firstly determines whether the neighboring STA may serve as the relay STA of the first STA. For example, if remaining capacity of the neighboring STA is greater than a preset threshold, the AP determines that the neighboring STA is the relay STA of the first STA.

It should further be understood that a relay STA may serve as a relay STA of a plurality of STAs.

550. The AP sends a relay response message to the first STA when the AP determines that data transmission may be performed by using the relay STA.

For example, the relay response message may carry identification information of at least one relay STA and the channel service period allocated to the first STA, so that the first STA sends data to the relay STA in the channel service period. It should be noted that when the channel corresponding to the channel service period is not the same as the channel currently used by the AP, and when the AP sends the allocated channel service period to the first STA, the relay response message also needs to carry the channel identification information corresponding to the channel service period. The channel identification information may be such a parameter as a channel index number or a channel central frequency.

Optionally, if the STA receives the information about the neighboring STAs from the AP when the STA accesses the network, the STA may select a proper neighboring STA from the information about the neighboring STAs, and the selected neighboring STA serves as the relay STA after the relay response message is received from the first STA.

555. The AP sends a relay indication message to the relay STA, so as to inform, by using the relay indication message, the relay STA of enabling a relay function. Step 555 is optional.

For example, the relay indication message carries the channel service period allocated by the AP, in which the first STA sends data to the relay STA. When receiving the data from the first STA in the channel service period, the relay STA reports the data to the AP. It should be noted that when the channel corresponding to the channel service period is not the same as the channel currently used by the AP, and when the AP indicates the allocated channel service period for the relay STA, the relay indication message also needs to carry the channel identification information corresponding to the channel service period. The channel identification information may be such a parameter as a channel index number or a channel central frequency, so that in the channel service period, the relay STA switches to a channel corresponding to the channel identification information to receive a message sent by the first STA.

Optionally, the relay indication message may carry identification information of the first STA. In this case, in step 550, the relay response message may not carry identification information of a second STA (a relay STA). For example, the second STA may determine whether to relay the data (that is, send the data to the AP) according to a source address of the received data. If the source address is consistent with the identification information of the first STA, the data is relayed.

560. The first STA sends the data to the relay STA in the channel service period.

For example, the first STA reports the data, in a form of a data frame, to the neighboring STA in the channel service period specified by the AP. It should be noted that when the channel corresponding to the channel service period is not the channel currently used by the AP to communicate with the first STA, the first STA firstly needs to switch, according to the channel identification information corresponding to the channel service period, for example, such a parameter as a channel index number or a channel central frequency, to the channel corresponding to the channel identification information.

Optionally, the identification information of the second STA may be carried in the data frame or a control frame, and control information (for example, a flag bit) may further be carried to indicate that the second STA serves as the relay STA of the first STA. In this case, step 555 may be omitted.

565. The relay STA sends the data to the AP in relay mode.

For example, the relay STA sends, to the AP, the data of the first STA (or together with the data of the relay STA and other STAs to be reported to the AP) in a form of a data frame.

Optionally, when the relay STA receives the channel identification information, in the channel service period, the relay STA switches to the channel corresponding to the channel identification information to receive a message sent by the first STA.

Figure 6:
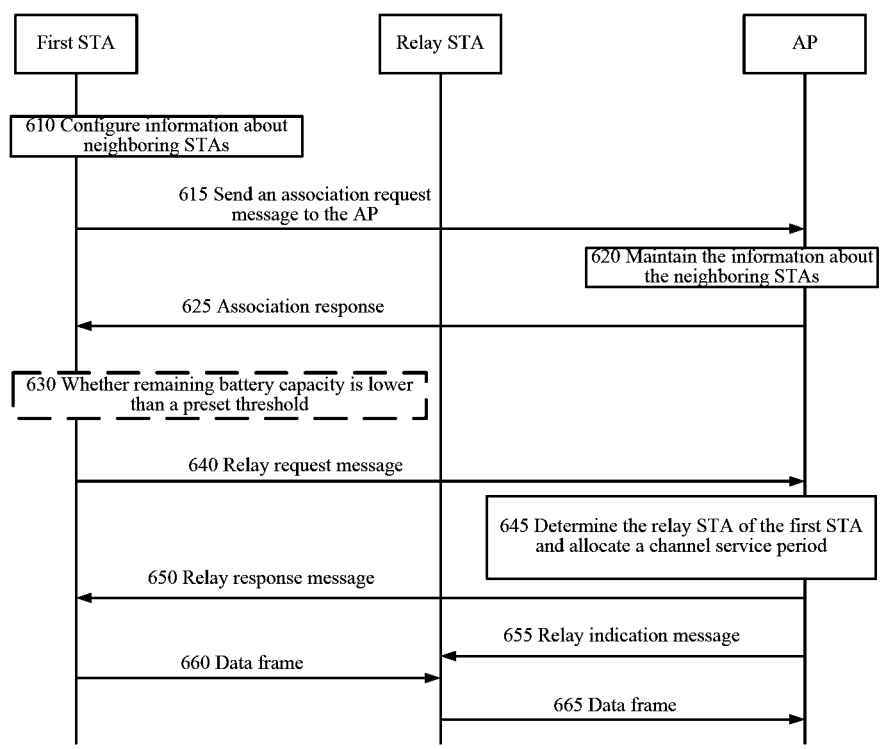
FIG. 6 is a schematic flowchart of a wireless transmission process according to another embodiment of the present invention.

FIG. 6 is a schematic flowchart of a wireless transmission process according to another embodiment of the present invention. Steps 655, 660, and 665 shown in FIG. 6 are similar to steps 555, 560, and 565 shown in FIG. 5. Details are not described herein again.

This embodiment describes an application scenario when information about neighbors of an STA is maintained in both the STA and an AP.

610. Pre-store information about neighboring STAs of a first STA in each STA.

For example, when a wireless sensor network is deployed, information about neighboring STAs surrounding each STA is configured in each STA according to a deployment location of the STA, for example, a neighboring STA list similar to that described in step 510 shown in FIG. 5.

615. The first STA sends an association request (Association Request) message to the AP during initial network access, so as to establish an association with the AP and report the information about the neighboring STAs to the AP.

For example, after the sensor network is deployed, each sensor STA directly communicates with the AP to perform an initial network access operation. If information about neighboring STAs of STAs in a coverage area of the AP needs to be simultaneously maintained in the AP, each of the STAs may report, by using a association request message, information about neighboring STAs to the AP when the STA accesses the network.

620. Maintain, in the AP, the information about the neighboring STAs of each sensor STA in a service area of the AP. Step 620 is similar to step 520 shown in FIG. 5. Details are not described herein again.

625. The AP sends an association response (Association Response) message to the first STA, so as to establish the association with the STA.

The AP may allocate, to each STA, a channel service period in which the STA communicates with the AP, and deliver the channel service period to the STA, so that the STA communicates with the AP only in the channel service period.

Optionally, when each STA accesses the network, the AP may deliver, by using an association response message, the information about the neighboring STAs for each STA to the first STA.

630. The first STA determines whether a battery level of the first STA is lower than a preset threshold.

For example, when the battery level of the first STA is lower than the preset threshold, the first STA cannot continuously send data to the AP. Step 630 is optional.

640. The first STA sends a relay request message to the AP that carries identification information of a selected neighboring STA when the battery level of the first STA is lower than the preset threshold.

For example, when a battery level of a first sensor STA is lower than a preset threshold (the first STA cannot continuously report monitoring data to the AP at a higher sending power at this time), sending of a relay request message to the AP is triggered. The first STA may select a proper neighboring STA from the stored information about the neighboring STAs and add the identification information of the neighboring STA to the relay request message.

Optionally, the STA may select the proper neighboring STA from the information about the neighboring STAs and add the identification information of the selected neighboring STA to the relay request message.

Optionally, the first STA may further send the relay request message to the AP when another preset policy is valid. For example, the relay request message may further be sent to the AP as required when remaining capacity of the first STA is sufficient for continuous data transmission with the AP. For an STA on an edge of the coverage area of the AP, the STA may send the relay request message to the AP when the first STA completes the initial access to the network, so as to report data to the AP by using a neighboring STA closer to the AP, thereby balancing battery consumption.

645. After receiving the relay request message, the AP determines, from the information about the neighboring STAs of the first STA maintained by the AP and according to a preset policy, the relay STA used for data transmission in relay mode, and allocates a channel service period used for data transmission in relay mode to the first STA and the relay STA. Further, a channel corresponding to the channel service period described herein may be a channel currently used by the AP or may be another channel.

650. The AP sends a relay response message to the first STA when the AP determines that data transmission may be performed by using the relay STA.

For example, the relay response message may carry identification information of at least one relay STA and the channel service period allocated to the first STA, so that the first STA sends data to the relay STA in the channel service period.

Optionally, when the AP determines that a neighboring STA indicated by the identification information of the neighboring STA carried in the relay request message may be used as the relay STA, the identification information of the neighboring STA may not be carried in the relay response message. That is, when receiving the relay response message, the STA determines the relay STA according to the identification information of the neighboring STA carried in the relay request message.

It should be noted that when the channel corresponding to the channel service period is not the same as the channel currently used by the AP, and when the AP indicates the allocated channel service period for the relay STA, the relay indication message also needs to carry the channel identification information corresponding to the channel service period. The channel identification information may be such a parameter as a channel index number or a channel central frequency, so that in the channel service period, the relay STA switches to a corresponding channel to receive a message sent by the first STA.

655. The AP sends a relay indication message to the relay STA, so as to inform, by using the relay indication message, the relay STA of enabling a relay function.

It should be noted that when the channel corresponding to the channel service period is not the same as the channel currently used by the AP, and when the AP indicates the allocated channel service period for the relay STA, the relay response message also needs to carry the channel identification information corresponding to the channel service period. The channel identification information may be such a parameter as a channel index number or a channel central frequency, so that in the channel service period, the relay STA switches to the corresponding channel to receive the message sent by the first STA.

660. The first STA reports the data to the relay STA in the channel service period.

665. The relay STA sends relay data to the AP in relay mode.

It should be noted that, in another embodiment, location information may further be configured in each STA, or the STA may obtain its own location information by using its own locating function, and report the location information to the AP by using a message (for example, an association request message), and the AP determines neighboring STA list information for each STA according to the location information of the STA, and then informs the STA of the neighboring STA list information.

Figure 7:
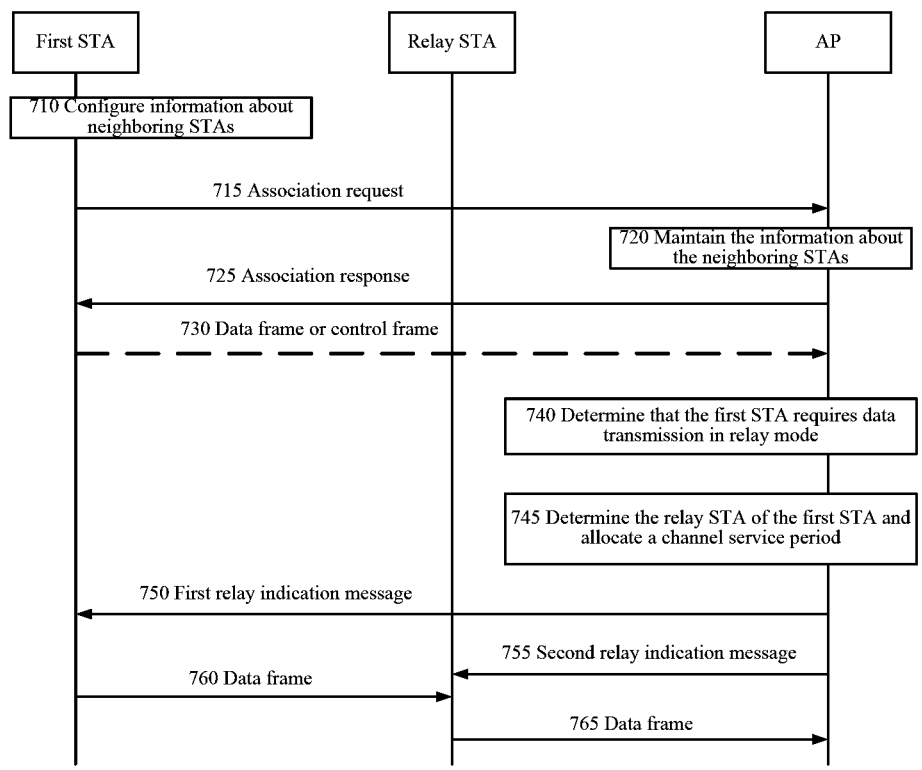
FIG. 7 is a schematic flowchart of a wireless transmission process according to another embodiment of the present invention.

FIG. 7 is a schematic flowchart of a wireless transmission process according to another embodiment of the present invention.

This embodiment describes an application scenario when an AP actively controls an STA so as to send data by using a relay STA to balance battery consumption. Steps 715 and 725 shown in FIG. 7 are similar to steps 615 and 625 shown in FIG. 6, and steps 760 and 765 shown in FIG. 7 are similar to steps 660 and 665 shown in FIG. 6. Detailed descriptions are omitted herein as appropriate.

710. Pre-store information about neighboring STAs of a first STA in each STA.

Optionally, the information about the neighboring STAs of the first STA may also be configured in the AP.

715. The first STA sends an association request message to the AP during initial network access, so as to establish an association with the AP and report the information about the neighboring STAs of the first STA to the AP.

720. Maintain, in the AP, information about neighboring STAs of each sensor STA in a service area of the AP.

725. The AP sends an association response message to the first STA, so as to establish the association with the STA.

730. The first STA directly reports data to the AP or a control frame.

740. The AP determines, according to a preset policy, the first STA that needs to perform data transmission by using a relay STA.

For example, the AP may determine whether an STA needs to perform data transmission by using a relay STA according to battery level information of the STA. For example, when a percentage of remaining battery capacity of the STA in the total battery capacity is lower than a preset threshold, it is determined that the STA needs to perform data transmission in relay mode; or when the remaining battery capacity of the STA is lower than a battery level of another adjacent STA, it is determined that the STA needs to perform data transmission in relay mode.

The AP may sample battery level information of each STA; for example, the STA periodically reports information, or the AP performs polling on each STA. Optionally, the AP may measure a battery level according to a transmit power of each STA for sending a message. For example, the message may carry the transmit power of an STA for sending the message. A higher transmit power indicates greater consumed capacity and less remaining capacity. For another example, the AP may estimate the remaining battery capacity of the STA after a period of time according to an initial battery level of the STA and an empirical value.

745. The AP determines, from the information about the neighboring STAs of the first STA maintained by the AP and according to the preset policy, the relay STA used for data transmission in relay mode, and allocates a channel service period used for data transmission in relay mode to the first STA and the relay STA. Further, a channel corresponding to the channel service period described herein may be or may not be the same as a channel currently used by the AP.

For example, the preset policy used to select the neighboring STA may be that: when a difference between remaining capacity of an STA and capacity of a neighboring STA exceeds a preset threshold, the STA with more capacity may transmit the data for the STA with less capacity in relay mode. For example, the neighboring STA that has a greatest capacity difference with or is the closest to the STA, or the STA that is the closest to the AP may be preferably selected by the first STA as the relay STA.

750. The AP sends a first relay indication message to the first STA when the AP determines that data transmission may be performed by using the relay STA.

For example, the first relay indication message may carry identification information of at least one relay STA and the channel service period allocated to the first STA, so that the first STA sends data to the relay STA in the channel service period.

It should be noted that when the channel corresponding to the channel service period is not the same as the channel currently used by the AP, and when the AP indicates the allocated channel service period for the relay STA, the first relay indication message also needs to carry the channel identification information corresponding to the channel service period. The channel identification information may be such a parameter as a channel index number or a channel central frequency, so that in the channel service period, the relay STA switches to a corresponding channel to receive a message sent by the first STA.

755. The AP sends a second relay indication message to the relay STA, so as to inform, by using the second relay indication message, the relay STA of enabling a relay function.

It should be noted that when the channel corresponding to the channel service period is not the same as the channel currently used by the AP, and when the AP indicates the allocated channel service period for the relay STA, the second relay indication message also needs to carry the channel identification information corresponding to the channel service period. The channel identification information may be such a parameter as a channel index number or a channel central frequency, so that in the channel service period, the relay STA switches to the corresponding channel to receive the message sent by the first STA.

For example, the second relay indication message carries the channel service period allocated by the AP, in which the first STA sends data to the relay STA. When receiving the data from the first STA in the channel service period, the relay STA reports the data to the AP.

Optionally, the second relay indication message may carry identification information of the first STA.

760. The first STA reports the data to the relay STA in the channel service period.

765. The relay STA sends relay data to the AP in relay mode.

The forgoing describes a wireless transmission method according to the embodiments of the present invention. The following describes an AP and an STA according to the embodiments of the present invention with reference to FIG. 8, FIG. 9, and FIG. 10 separately.

Figure 8:
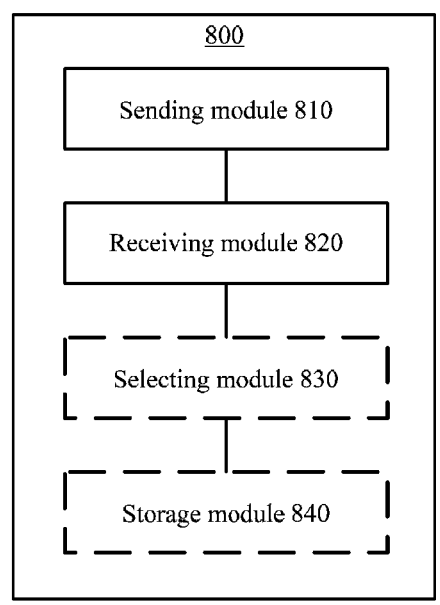
FIG. 8 is a schematic structural diagram of an access point according to an embodiment of the present invention.

FIG. 8 is a schematic structural diagram of an AP 800 according to an embodiment of the present invention. The AP 800 includes a sending module 830 and a receiving module 820.

The sending module 810 is configured to send a first message to a first STA, where the first message includes a channel service period allocated by the AP to the first STA. The first message is used to indicate that the first STA sends data to a relay STA of the first STA in the channel service period. The receiving module 820 is configured to receive the data from the relay STA of the first STA.

In this embodiment of the present invention, an AP may send an allocated channel service period to an STA, so that the STA sends data to another STA in the channel service period, and then the another STA sends the data to the AP, so that the STA performs normal data transmission with the AP by using the another STA.

The sending module 810 further sends a second message to a second STA, where the second message is used to indicate that the second STA serves as the relay STA.

Optionally, in another embodiment, the second message includes identification information of the first STA, and is used to indicate that the second STA serves as the relay STA of the first STA.

Optionally, in another embodiment, the second message includes identification information of the first STA and the channel service period in which the first STA sends data to the relay STA, and is used to indicate that the second STA serves as the relay STA of the first STA, and indicate that in the channel service period, the second STA receives the data from the first STA on a channel currently used by the AP.

Optionally, in another embodiment, the second message includes identification information of the first STA and channel identification information corresponding to the channel service period, and is used to indicate that the second STA serves as the relay STA of the first STA, and indicate that in the channel service period, the second STA switches to a channel corresponding to the channel identification information to receive the data from the first STA.

Optionally, in another embodiment, the first message further includes identification information of the second STA, where the identification information of the second STA is used by the first STA to determine that the second STA serves as the relay STA of the first STA.

Optionally, in another embodiment, the first message further includes identification information of the second STA and channel identification information corresponding to the channel service period, where the identification information of the second STA is used by the first STA to determine that the second STA serves as the relay STA of the first STA, and the channel identification information corresponding to the channel service period is used to indicate that in the channel service period, the first STA switches to a channel corresponding to the channel identification information to send the data to the second STA.

Optionally, in another embodiment, the AP 800 further includes a selecting module 830, configured to select, from information about neighboring STAs of the first STA, the second STA as the relay STA, where the information about the neighboring STAs of the first STA is used to indicate information about an STA adjacent to the first STA.

Optionally, in another embodiment, the AP 800 further includes a storage module 840. The storage module 840 stores and maintains the information about the neighboring STAs of the first STA, where the sending module 810 further sends a message that carries the information about the neighboring STAs of the first STA to the first STA; and/or, the receiving module 820 receives, from the first STA, the message that carries the information about the neighboring STAs of the first STA, where the storage module 840 maintains the information about the neighboring STAs of the first STA; and/or, the receiving module 820 receives a message that carries location information of the first STA and determines the information about the neighboring STAs of the first STA according to the location information of the first STA, and the storage module 840 maintains the information about the neighboring STAs of the first STA.

Optionally, in another embodiment, before the sending module 810 sends the first message to the first STA, the receiving module 820 further receives a relay request message from the first STA, where the relay request message is used to request, by the first STA, sending of data to the AP by using the relay STA of the first STA.

Optionally, in another embodiment, the relay request message further includes identification information of the relay STA selected by the first STA from the information about the neighboring STAs of the first STA, where the information about the neighboring STAs of the first STA is used to indicate information about an STA adjacent to the first STA.

According to this embodiment of the present invention, the sending module 810 actively sends the first message to the first STA according to a preset policy.

For operations and functions of each unit of the AP 800, refer to steps 210 and 220 of the method shown in FIG. 2. To avoid repetition, details are not described herein again.

Figure 9:
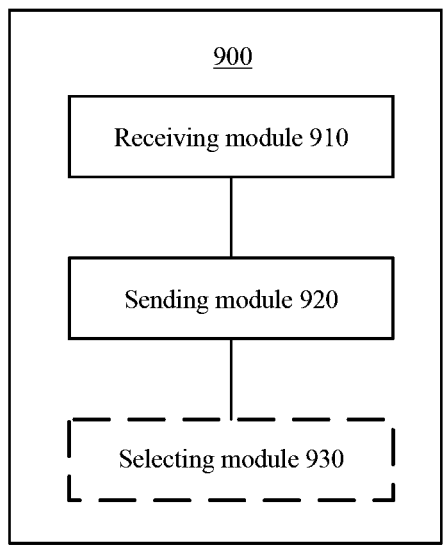
FIG. 9 is a schematic structural diagram of a station according to an embodiment of the present invention.

FIG. 9 is a schematic structural diagram of an STA 900 according to an embodiment of the present invention. The STA 900 includes a receiving module 910 and a sending module 920.

The receiving module 910 is configured to receive a first message from an AP, where the first message includes a channel service period allocated by the AP to the STA. The sending module 920 is configured to send data to a relay STA of the STA in the channel service period, so that the relay STA of the STA sends the data to the AP.

In this embodiment of the present invention, an AP may send an allocated channel service period to an STA, so that the STA sends data to another STA in the channel service period, and then the another STA sends the data to the AP, so that the STA performs normal data transmission with the AP by using the another STA.

Optionally, in another embodiment, the first message includes identification information of a second STA, and is used to determine that the second STA serves as the relay STA of the STA.

Optionally, in another embodiment, the first message includes identification information of a second STA and channel identification information corresponding to the channel service period, where the identification information of the second STA is used by the STA to determine that the second STA serves as the relay STA of the STA, and the channel identification information corresponding to the channel service period is used to indicate that in the channel service period, the STA 900 switches to a channel corresponding to the channel identification information to send data to the second STA.

Optionally, in another embodiment, the STA 900 further includes a selecting module 930. The selecting module 930 selects a second STA as the relay STA from information about neighboring STAs stored in the STA.

Optionally, in another embodiment, the sending module 920 further sends a message that carries location information of the STA to the AP; and/or, the receiving module 910 further receives, from the AP, a message that carries information about neighboring STAs of the STA maintained by the AP; and/or, the sending module 920 further sends, to the AP, a message that carries the information about the neighboring STAs of the STA stored in the STA.

Optionally, in another embodiment, before the STA 900 receives the first message from the AP, the sending module 920 further sends a relay request message to the AP, where the relay request message is used to request sending of data to the AP by using the relay STA of the STA.

Optionally, in another embodiment, the relay request message further carries identification information of the relay STA selected by the STA from the information about the neighboring STAs.

According to this embodiment of the present invention, the sending module 920 is specifically configured to send data to the relay STA of the STA in the channel service period, and send the relay request message to the AP when a battery level is lower than a first preset threshold; or, the sending module 920 is specifically configured to send the data to the relay STA of the STA in the channel service period and send the relay request message to the AP upon completion of initial access to a network.

According to this embodiment of the present invention, the receiving module 910 receives, from the AP, the first message actively sent by the AP, where the first message is used to indicate that the STA sends data to the relay STA.

Optionally, in another embodiment, the sending module 920 further sends a third message to a second STA, where the third message carries identification information of the second STA, and is used to indicate that the second STA serves as the relay STA of the STA.

Optionally, the sending module is further configured to send a third message to a second STA, where the third message includes identification information of the second STA and channel identification information corresponding to the channel service period, and is used to indicate that the second STA serves as the relay STA of the first STA, and indicate that in the channel service period, the second STA switches to a channel corresponding to the channel identification information to receive the data from the first STA.

Optionally, in another embodiment, the sending module 920 further sends, to the second STA, a message that includes control information and the data, where the control information is used to indicate that the second STA transmits the data in relay mode for the second STA.

For operations and functions of each unit of the STA 900, refer to steps 310 and 320 of the method shown in FIG. 3. To avoid repetition, details are not described herein again.

Figure 10:
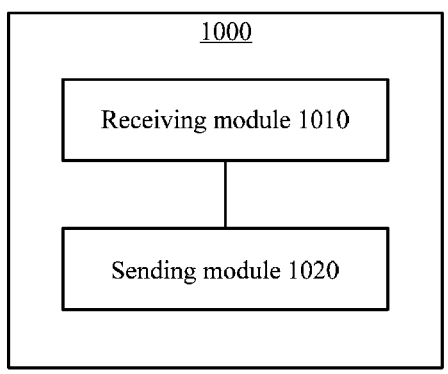
FIG. 10 is a schematic structural diagram of a station according to an embodiment of the present invention.

FIG. 10 is a schematic structural diagram of an STA 1000 according to an embodiment of the present invention. The STA 1000 includes a receiving module 1010 and a sending module 1020.

The receiving module 1010 receives a message that is used to indicate that the STA serves as a relay STA, and receives data from a first STA in a channel service period allocated by an AP to the first STA. The sending module 1020 transmits the data received from the first STA to the AP.

In this embodiment of the present invention, an AP may send an allocated channel service period to an STA, so that the STA sends data to another STA in the channel service period, and then the another STA sends the data to the AP, so that the STA performs normal data transmission with the AP by using the another STA.

According to this embodiment of the present invention, the receiving module 1020 further receives a second message from the AP, where the second message further includes identification information of the first STA, and is used to indicate that the STA serves as a relay STA of the first STA; or the receiving module receives a second message from the AP, where the second message includes identification information of the first STA and the channel service period in which the first STA sends data to the relay STA, and is used to indicate that the STA serves as the relay STA of the first STA, and indicate that the STA 1000 receives the data from the first STA in the channel service period; or, the receiving module 1010 further receives, from the first STA, a message that includes control information and the data, where the control information is used to indicate that the STA transmits the data in relay mode for the first STA; or, the receiving module 1010 further receives, from the first STA, a third message, which is used to indicate that a second STA serves as the relay STA of the first STA; or, the receiving module 1010 further receives a third message from the first STA, where the third message includes identification information of the first STA and channel identification information corresponding to the channel service period, and is used to indicate that the STA 1000 serves as the relay STA of the first STA, and indicate that in the channel service period, the STA 1000 switches to a channel corresponding to the channel identification information to receive the data from the first STA; or, the receiving module 1010 further receives a second message from the AP, where the second message includes identification information of the first STA and channel identification information corresponding to the channel service period, and is used to indicate that the STA serves as the relay STA of the first STA, and indicate that in the channel service period, the STA 1000 switches to a channel corresponding to the channel identification information to receive the data from the first STA.

According to this embodiment of the present invention, the sending module 1020 directly sends the data received from the first STA to the AP.

Optionally, in another embodiment, the sending module 1020 sends, to the AP, data formed by integrating the data received from the first STA with data of the second STA and/or data of a third STA, where the STA is a relay STA of the third STA.

For operations and functions of each unit of the STA 1000, refer to steps 410, 420 and 430 of the method shown in FIG. 4. To avoid repetition, details are not described herein again.

The embodiments of the present invention may bring the following beneficial effects: In a coverage area of an AP, a problem that capacity is running out quickly because an STA farther from the AP requires a higher power to directly communicate with the AP is avoided. On an 802.11ah sensor network, when remaining capacity of an STA is lower than a threshold, the STA cannot continuously communicate with the AP at a higher power. By using this solution, the STA can report data in relay mode to the AP at a lower power by using a neighbor. In addition, by using this solution, capacity of each sensor STA may be consumed evenly, thereby ensuring normal operation of the entire sensor network to a greatest extent.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several indications for indicating a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A wireless transmission method in a wireless network including an access point, a first station and a relay station that sends received data from the first station to the access point, the method comprising:
    allocating, by the access point, an awake period to at least one of the first station or the relay station;
    receiving, by the access point, an association request from the first station;
    establishing, by the access point, an association with the first station;
    allocating a channel service period of the relay station for receiving data from the first station;
    sending, by the access point to the first station after the allocating, a first message specifying the channel service period of the relay station allocated by the access point to the first station, the first message indicating that data is to be sent by the first station, to the access point, using the channel service period of the relay station; and receiving from the relay station, by the access point, data of the first station previously received by the relay station of the first station in the channel service period allocated by the access point, wherein
    the first station sends data to the relay station during a period when the awake period overlaps with the allocated channel service period.

2. The method according to claim 1, further comprising sending, by the access point, a second message to a second station, wherein the second message is used to indicate that the second station serves as the relay station.

3. The method according to claim 2, wherein the second message comprises identification information of the first station and indicates that the second station serves as the relay station of the first station, or
    wherein the second message comprises identification information of the first station and the channel service period in which the first station sends the data to the relay station and indicates that the second station serves as the relay station of the first station and receives, during the channel service period, the data from the first station on a channel currently used by the access point, or
    the second message comprises identification information of the first station and channel identification information corresponding to the channel service period and indicates that the second station serves as the relay station of the first station and switches, in the channel service period, to a channel corresponding to the channel identification information to receive the data from the first station.

4. The method according to claim 1, wherein the first message further comprises:
    identification information of a second station used by the first station to determine that the second station serves as the relay station of the first station, or
    identification information of a second station used by the first station to determine that the second station serves as the relay station of the first station and channel identification information corresponding to the channel service period used to indicate that the first station switches to a channel corresponding to the channel identification information in the channel service period to send the data to the second station.

5. The method according to claim 2, further comprising:
    selecting, by the access point from at least one station adjacent to the first station based on information used to indicate the at least one station adjacent to the first station, the second station as the relay station.

6. The method according to claim 1, further comprising one or more of the group consisting of:
    storing and maintaining, by the access point, information about neighboring stations of the first station, and sending a message that carries the information about the neighboring stations of the first station to the first station;
    receiving, by the access point from the first station, a message that carries information about neighboring stations of the first station, and maintaining, by the access point, the information about the neighboring stations of the first station; and
    receiving, by the access point, a message that carries location information of the first station, and determining and maintaining, by the access point, information about neighboring stations of the first station according to the location information of the first station.

7. The method according to claim 1, wherein before the sending, by the access point, the first message to the first station, the method further comprises:

sending, by the first station, a relay request message to the access point requesting sending of data to the access point through the relay station of the first station.

8. The method according to claim 7, wherein the relay request message further comprises: identification information of a station selected by the first station from neighboring stations indicated by information about neighboring stations of the first station used to indicate at least one station adjacent to the first station and used for data transmission in relay mode.

9. The method according to claim 1, wherein sending, by an access point, a first message to a first station, comprises:
actively sending, by the access point according to a preset policy, the first message to the first station.

10. A wireless transmission method in a wireless network including an access point, a first station and a relay station that sends received data from the first station to the access point, the method comprising:
allocating, by the access point, an awake period to at least one of the first station or the relay station;
sending, by the first station, an association request to the access point to establish an association between the first station and the access point;
receiving, by the first station from the access point, a first message specifying a channel service period of the relay station allocated by the access point to the first station, the first message indicating that data is to be sent by the rust station, to the access point, using the channel service period of the relay station; and
sending to the relay station, by the first station after the receiving, data of the first station for the access point, in the channel service period allocated by the access point, so that the relay station of the first station can relay the data of the first station to the access point, wherein
the first station sends data to the relay station during a period when the awake period overlaps with the allocated channel service period.

11. The method according to claim 10, wherein the first message comprises:
identification information of a second station used by the first station to determine that the second station serves as the relay station of the first station; or
identification information of a second station used by the first station to determine that the second station serves as the relay station of the first station, and channel identification information corresponding to the channel service period used to indicate that in the channel service period the first station switches to a channel corresponding to the channel identification information to send the data to the second station;
wherein sending, by the first station, data to a relay station of the first station in the channel service period includes the first station switches to the channel corresponding to the channel identification information in the channel service period to send the data to the second station.

12. The method according to claim 10, further comprising:
selecting, by the first station, a second station as the relay station from neighboring stations indicated by information about neighboring stations stored in the first station.

13. The method according to claim 10, further comprising one or more of the group consisting of:
sending, by the first station, a message that carries location information of the first station to the access point;

receiving, by the first station from the access point, a message that carries information about neighboring stations of the first station maintained by the access point; and
sending, by the first station and to the access point, a message that carries information about neighboring stations of the first station stored in the first station.

14. The method according to claim 10, wherein before the receiving, by the first station, the first message from the access point, the method further comprises:
sending, by the first station to the access point, a relay request message requesting sending of data to the access point through the relay station of the first station.

15. The method according to claim 14, wherein the relay request message further carries identification information of a relay station selected by the first station from information about neighboring stations of the first station.

16. The method according to claim 14, wherein sending, by the first station, the relay request message to the access point, comprises:
sending, by the first station, the relay request message to the access point when a battery level is lower than a first preset threshold, or
sending, by the first station, the relay request message to the access point upon completion of initial access to a network.

17. The method according to claim 10, wherein the receiving, by the first station, the first message from the access point, comprises:
receiving, by the first station and from the access point, the first message,
wherein the first message is actively sent by the access point according to a preset policy, and
wherein the first message is used to indicate that the first station sends data to the relay station.

18. The method according to claim 10, further comprising one or more of the group consisting of:
sending, by the first station to a second station, a third message that carries identification information of the second station and is used to indicate that the second station serves as the relay station of the first station,
sending, by the first station to a second station, a third message, that includes identification information of the second station and channel identification information corresponding to the channel service period, used to indicate that the second station serves as the relay station of the first station and that the second station switches to a channel corresponding to the channel identification information to receive the data from the first station in the channel service period and,
sending, by the first station and to a second station, a message that comprises control information and the data, wherein the control information is used to indicate that the second station transmits the data in relay mode for the first station.

19. A wireless transmission method in a wireless network including an access point, a first station having a current association with the access point according to a previous association request by the first station to the access point, and a second station that sends received data from the first station to the access point, the method comprising:
allocating, by the access point, an awake period to at least one of the first station or the second station;
receiving, by the second station, a data relay channel service period configuration message indicating that the access point, in a first message to the first station, designated the second station as a relay station for data sent from the first station in a channel service period of the second station allocated by the access point;

receiving, by the second station from the first station, data within the channel service period allocated by the access point; and transmitting, by the second station to the access point, data received from the first station to the access point during the receiving, wherein the first station sends data to the second station during a period when the awake period overlaps with the channel service period.

20. The method according to claim 19, wherein receiving, by the second station, the message that is used to indicate that the second station serves as a relay station comprises one of the group consisting of:

receiving, by the second station, a second message from the access point that includes identification information of the first station and is used to indicate that the second station serves as a relay station of the first station, receiving, by the second station, a second message from the access point, that includes identification information of the first station and of a channel service period in which the first station sends data to the relay station used to indicate that the second station receives the data from the first station in the channel service period, receiving, by the second station from the first station, a message that comprises control information and the data, wherein the control information is used to indicate that the second station transmits the data in relay mode for the first station, receiving, by the second station from the first station, a third message used to indicate that the second station serves as a relay station of the first station, receiving, by the second station from the first station, a third message used to indicate that the second station serves as a relay station of the first station that includes channel identification information corresponding to a channel service period used to indicate that the second station switches to a channel corresponding to the channel identification information to transmit the data in the channel service period, and receiving, by the second station from the access point, a second message from the access point that includes channel identification information corresponding to the channel service period used to indicate that the second station switches to a channel corresponding to the channel identification information to transmit the data in the channel service period.

21. The method according to claim 19, wherein transmitting, by the second station, the data received from the first station to the access point, comprises one of the group consisting of:

directly sending, by the second station to the access point, the data received from the first station to the access point, and sending, by the second station to the access point, data formed by integrating the data received from the first station and one or more of data of the second station and data of a third station, wherein the second station is a relay station of the third station.

22. An access point, comprising:
a computing hardware; and
a non-transitory computer-readable medium including computer-executable instructions that are executed on the computing hardware to perform a wireless transmission method in a wireless network including the access point, a first station and a relay station that sends received data from the first station to the access point, the method comprising:

allocating, by the access point, an awake period to at least one of the first station or the relay station;

receiving, by the access point, an association request from the first station;

establishing, by the access point, an association with the first station;

allocating a channel service period of the relay station for receiving data from the first station;

sending, by the access point to the first station after the allocating, a first message specifying the channel service period of the relay station allocated by the access point to the first station, the first message indicating that data is to be sent by the first station, to the access point, using the channel service period of the relay station; and receiving from the relay station, by the access point, data of the first station previously received by the relay station of the first station in the channel service period allocated by the access point, wherein the first station sends data to the relay station during a period when the awake period overlaps with the allocated channel service period.

23. The access point according to claim 22, wherein the computer-readable medium is further configured to facilitate the access point sending second message to a second station, wherein the second message is used to indicate that the second station serves as the relay station.

24. The access point according to claim 23, further comprising one of the group consisting of:

the second message comprises identification information of the first station and is used to indicate that the second station serves as the relay station of the first station, the second message comprises identification information of the first station and the channel service period in which the first station sends the data to the relay station and is used to indicate that the second station serves as the relay station of the first station and that the second station receives the data from the first station on a channel currently used by the access point in the channel service period, and the second message comprises identification information of the first station and channel identification information corresponding to the channel service period and is used to indicate that the second station serves as the relay station of the first station and that the second station switches to a channel corresponding to the channel identification information to receive the data from the first station in the channel service period.

25. The access point according to claim 22, wherein the first message further comprises one of the group consisting of:

identification information of a second station used by the first station to determine that the second station serves as the relay station of the first station and, identification information of a second station used by the first station to determine that the second station serves as the relay station of the first station and channel identification information corresponding to the channel service period used to indicate that the first station switches to a channel corresponding to the channel identification information to send the data to the second station in the channel service period.

26. The access point according to claim 22, wherein the non-transitory computer-readable medium is further configured to facilitate performing the method further comprising:
   selecting the second station as the relay station from one or more stations adjacent to the first station as indicated by information about neighboring stations of the first station from the information about the neighboring stations of the first station.

27. The access point according to claim 22, wherein the non-transitory computer-readable medium is further configured to facilitate performing the method further comprising storing and maintaining information about neighboring stations of the first station; and
   wherein the method further comprises one of the group consisting of:
   sending a message to the first station that carries the information about the neighboring stations of the first station,
   receiving, from the first station, a message that carries the information about the neighboring stations of the first station, and
   receiving, from the first station, a message that carries location information of the first station and to determine the information about the neighboring stations of the first station according to the location information of the first station.

28. The access point according to claim 22, wherein the method further comprises receiving, before the sending module sends the first message to the first station, a relay request message from the first station used to request, by the first station, sending of data to the access point by using the relay station of the first station.

29. The access point according to claim 27, wherein the relay request message further comprises identification information of a relay station selected by the first station from information about neighboring stations of the first station; and
   wherein the information about the neighboring stations of the first station is used to indicate information about a station adjacent to the first station.

30. The access point according to claim 22, wherein the sending comprises actively sending the first message to the first station according to a preset policy.

31. A station, comprising:
   a computing hardware; and
   a non-transitory computer-readable medium including computer-executable instructions that are executed on the computing hardware to perform a wireless transmission method in a wireless network including an access point, the station and a relay station that sends received data from the station to the access point, the method comprising:
   allocating, by the access point, an awake period to at least one of the first station or the relay station;
   sending, by the station, an association request to the access point to establish an association between the station and the access point;
   receiving, by the station from the access point, a first message specifying a channel service period of the relay station allocated by the access point to the station, the first message indicating that data is to be sent by the station, to the access point, using the channel service period of the relay station; and
   sending to the relay station, by the station after the receiving, data of the station for the access point, in the channel service period allocated by the access point, so that the relay station of the station can relay the data of the station to the access point, wherein the first station sends data to the relay station during a period when the awake period overlaps with the allocated channel service period.

32. The station according to claim 31, wherein the first message comprises one of the group consisting of:
   identification information of a second station used by the station to determine that the second station serves as the relay station of the station, or
   identification information of a second station used by the station to determine that the second station serves as the relay station of the station and channel identification information corresponding to the channel service period used to indicate that in the channel service period, the station switches to a channel corresponding to the channel identification information to send the data to the second station.

33. The station according to claim 31, wherein the method further comprises:
   selecting a second station as the relay station from one or more neighboring stations indicated by information about neighboring stations stored in the station.

34. The station according to claim 31, wherein the method further comprises one of the group consisting of:
   sending a message that carries location information of the station to the access point,
   receiving, from the access point, a message that carries information about neighboring stations of the station maintained by the access point, and
   sending, to the access point, a message that carries information about neighboring stations of the station stored in the station.

35. The station according to claim 31, wherein the sending comprises sending to the access point before the station receives the first message from the access point, a relay request message used to request sending of data to the access point by using the relay station of the station.

36. The station according to claim 35, wherein the relay request message further carries identification information of a relay station selected by the station from information about neighboring stations.

37. The station according to claim 35, wherein the sending comprises one of the group consisting of:
   sending data to the relay station of the station in the channel service period and send the relay request message to the access point when a battery level is lower than a first preset threshold, and
   sending data to the relay station of the station in the channel service period and send the relay request message to the access point upon completion of initial access to a network.

38. The station according to claim 31, wherein the receiving comprises receiving, from the access point, the first message, wherein the first message is used to indicate that the station sends data to the relay station.

39. The station according to claim 31, wherein the sending comprises one of the group consisting of:
   sending, to a second station, a third message that carries identification information of the second station and is used to indicate that the second station serves as the relay station of the station,
   sending, to a second station, a third message that includes identification information of the second station used to indicate that the second station serves as the relay station of the first station and channel identification information corresponding to the channel service period used to indicate that in the channel service period, the second station switches to a channel corresponding to the channel identification information to receive the data from the first station, and the sending further comprises sending, to the second station, a message that comprises the data and control information used to indicate that the second station transmits the data in relay mode for the station.

40. A station, comprising:

a computing hardware; and a non-transitory computer-readable medium including computer-executable instructions that are executed on the computing hardware to perform a wireless transmission method in a wireless network including an access point, a first station and the station that sends received data from the station to the access point, the method comprising:

receiving, by the station, a data relay channel service period configuration message indicating that the access point, in a first message to the first station, designated the second station as a relay station for data sent from the first station in a channel service period of the second station allocated by the access point and an awake period allocated by the access point to the first station or the relay station;

receiving, by the station from the first station, data within the channel service period allocated by the access point and the awake period allocated by the access point; and transmitting, by the station to the access point, data received from the first station to the access point during the receiving.

41. The station according to claim 40, wherein the non-transitory computer-readable medium is further configured to include instructions to perform one of the group consisting of:

receiving, from the access point, a second message that includes identification information of the first station and is used to indicate that the station serves as a relay station of the first station, receiving, from the access point, a second message that includes identification information of the first station used to indicate that the station serves as a relay station of the first station, and includes the channel service period in which the first station sends data to the relay station used to indicate that the station receives the data from the first station in the channel service period, receiving, from the first station, a message that comprises the data and control information used to indicate that the station transmits the data in relay mode for the first station, receiving, from the first station, a third message used to indicate that a second station serves as a relay station of the first station, receiving, from the first station, a third message that includes identification information of the first station used to indicate that the station serves as a relay station of the first station and includes channel identification information used to indicate that in the channel service period, the station switches to a channel corresponding to the channel identification information to receive the data from the first station, and receiving, from the access point, a second message that includes identification information of the first station used to indicate that the station serves as a relay station of the first station and channel identification information used to indicate that in the channel service period, the station switches to a channel corresponding to the channel identification information to receive the data from the first station.

42. The station according to claim 40, wherein the non-transitory computer-readable medium is specifically configured to perform one of the group consisting of:

directly sending the data received from the first station to the access point, and sending, to the access point, data formed by integrating the data received from the first station with one or more of data of the station and data of a third station, wherein the station is a relay station of the third station.

* * * * *

UNITED STATES PATENT AND TRADEMARK OFFICE
CERTIFICATE OF CORRECTION

PATENT NO.         : 9,549,405 B2
APPLICATION NO.    : 14/334382
DATED              : January 17, 2017
INVENTOR(S)        : Shu It is certified that error appears in the above-identified patent and that said Letters Patent is hereby corrected as shown below:

In the Claims

Column 27, Line 29, Claim 10 delete "the rust station" and insert -- the first station --.

Signed and Sealed this
Second Day of May, 2017

Michelle K. Lee
*Director of the United States Patent and Trademark Office*